(12) United States Patent
Park et al.

(10) Patent No.: US 7,952,565 B2
(45) Date of Patent: May 31, 2011

(54) DISPLAY DEVICE AND METHOD OF CONTROLLING TOUCH DETECTION UNIT

(75) Inventors: Jong-Woung Park, Seongnam-si (KR);
Joo-Hyung Lee, Gwacheon-si (KR);
Kee-Han Uh, Yongin-si (KR);
Man-Seung Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1134 days.

(21) Appl. No.: 11/710,324

(22) Filed: Feb. 22, 2007

(65) Prior Publication Data
US 2007/0200833 A1    Aug. 30, 2007

(30) Foreign Application Priority Data

Feb. 24, 2006   (KR) .................. 10-2006-0018088

(51) Int. Cl.
*G06F 3/041* (2006.01)
(52) U.S. Cl. ....................................... 345/173
(58) Field of Classification Search .......... 345/156–179; 178/18.01–19.06; 463/37
See application file for complete search history.

(56) References Cited

U.S. PATENT DOCUMENTS

| | | | | |
|---|---|---|---|---|
| 4,680,429 A | * | 7/1987 | Murdock et al. ........... | 178/20.02 |
| 5,376,947 A | * | 12/1994 | Kuroda ........................ | 345/173 |
| 5,396,443 A | * | 3/1995 | Mese et al. .................... | 713/321 |
| 5,481,278 A | * | 1/1996 | Shigematsu et al. .......... | 345/179 |
| 5,621,437 A | | 4/1997 | Jeong | |
| 7,688,315 B1 | * | 3/2010 | Gettemy et al. .............. | 345/174 |
| 2005/0146511 A1 | * | 7/2005 | Hill et al. ....................... | 345/173 |
| 2006/0227114 A1 | * | 10/2006 | Geaghan et al. .............. | 345/173 |

FOREIGN PATENT DOCUMENTS

| | | |
|---|---|---|
| JP | 2003-15779 | 1/2003 |
| JP | 2005-18669 | 1/2005 |
| KR | 2000-0014082 | 3/2000 |
| KR | 2001-0099014 | 11/2001 |
| KR | 2003-0055979 | 7/2003 |
| KR | 10-2004-0042148 | 5/2004 |
| KR | 10-2004-0057806 | 7/2004 |

(Continued)

OTHER PUBLICATIONS

Patent Abstracts of Japan, Publication No. 2003-015779, Jan. 17, 2003, 1 p.

(Continued)

*Primary Examiner* — Richard Hjerpe
*Assistant Examiner* — Carolyn R Edwards
(74) *Attorney, Agent, or Firm* — Innovation Counsel LLP (57) ABSTRACT

A display device may include a display panel, a plurality of pixels that are disposed on the display panel, a plurality of sensing units that are disposed on the display panel to generate sensing signals based on touch of the display panel, a sensing signal processor that receives the sensing signals and performs predetermined signal processes to generate sensing data, and a touch detection unit. The touch detection unit may include a first controller that determines, based on the sensing data from the sensing signal process, whether or not there is a touch occurrence of the sensing units and whether or not the sensing signal is in an appropriate state. The touch detection unit may also include a second controller that determines the touch occurrence and touch positions on the sensing units based on the sensing data and controls the sensing signals to be in the desired range.

24 Claims, 9 Drawing Sheets

FOREIGN PATENT DOCUMENTS

KR 10-2004-0103125 12/2004

OTHER PUBLICATIONS

Patent Abstracts of Japan, Publication No. 2005-018669, Jan. 20, 2005, 1 p.

Korean Patent Abstracts, Publication No. 1020000014082, Mar. 6, 2000, 1 p.

Korean Patent Abstracts, Publication No. 1020010099014, Nov. 9, 2001, 1 p.

Korean Patent Abstracts, Publication No. 1020030055979, Jul. 4, 2003, 1 p.

Korean Patent Abstracts, Publication No. 1020040042148, May 20, 2004, 2 pp.

Korean Patent Abstracts, Publication No. 1020040057806, Jul. 2, 2004, 1 p.

Korean Patent Abstracts, Publication No. 1020040103125, Dec. 8, 2004, 1 p.

* cited by examiner

DISPLAY DEVICE AND METHOD OF CONTROLLING TOUCH DETECTION UNIT

CROSS-REFERENCE TO RELATED APPLICATION

This application claims priority to and the benefit of Korean Patent Application No. 10-2006-0018088 filed in the Korean Intellectual Property Office on Feb. 24, 2006, the entire contents of which is incorporated herein by reference.

BACKGROUND (a) Technical Field

The present invention relates to a display device and a method of controlling a touch detection unit thereof.

(b) Related Art

Conventional liquid crystal display (LCD) devices include two display panels having pixel electrodes and a common electrode, respectively, and a liquid crystal layer having an anisotropic dielectric interposed between the two display panels. The pixel electrodes are arranged in a matrix and connected to corresponding switching elements such as thin film transistors (TFTs) that may be sequentially applied with data voltages. The common electrode is disposed over the entire surface of the display panel and may be applied with a common voltage. The liquid crystal layer interposed between the pixel electrode and the common electrode constitutes a liquid crystal capacitor. The liquid crystal capacitor together with the switching element connected thereto serves as a basic unit of a pixel.

In such liquid crystal display devices a voltage is applied to the two electrodes to generate an electric field in the liquid crystal layer. The intensity of the electric field may be adjusted to control transmittance of light passing through the liquid crystal layer, so that a desired image can be obtained. In order to prevent degradation of the liquid crystal layer caused by long-term application of the electric field in one direction to the liquid crystal layer, polarities of data voltages with respect to the common voltage may be inverted for each frame, row, or pixel.

Touch screen panels may be attached to liquid crystal display devices to detect the touch (or contact) of a user's finger, touch pen, or stylus and the position of the touch to facilitate the writing or drawing of characters or images, or to detect the touching of an icon to cause a machine such as a computer to execute desired commands. However, such configurations can be costly due to the cost of the touch screen panel and the additional process of attaching the touch screen panel to the liquid crystal display device. Such configurations may also result in a deterioration in luminance of the liquid crystal panel and an increase in thickness of the liquid crystal display device.

Sensing elements constructed with thin film transistors or variable capacitors built into the display region of liquid crystal display devices may be used as a substitute for touch screen panels. The sensing elements detect changes in light or pressure on a screen so as to detect the touch of a user's finger or the like on the screen and the position of the touch.

However, the signals from the sensing elements built into the liquid crystal display device need to be processed to determine whether a touch has occurred and the position of the touch on the selecting units, and to adjust a driving voltage to allow the levels of the sensing signals (that vary with changes in the panel of the liquid crystal display device or surrounding environments) to be in a desired range. In such cases, a processor such an advanced RISC machine (ARM) may be used. Unfortunately, such processes may consume large amounts of power when accessing memory or generating driving clock signals.

SUMMARY

Various embodiments of display devices and methods of controlling a touch detection unit disclosed herein may advantageously reduce power consumption associated with the operation of sensing units.

One embodiment of the invention provides a display device including: a display panel; a plurality of pixels that are disposed on the display panel; a plurality of sensing units that are disposed on the display panel to generate sensing signals based on touch of the display panel; a sensing signal processor that receives the sensing signals and performs predetermined signal processes to generate sensing data; and a touch detection unit having a first controller that determines, based on the sensing data from the sensing signal process, whether or not there is a touch occurrence of the sensing units and whether or not the sensing signal is in a desired range and a second controller that determines the touch occurrence and touch positions on the sensing units based on the sensing data and controls the sensing signals to be in the desired range.

In the above embodiment of the invention, the second controller may be an ARM (advanced RISC machine).

The first controller may be constructed with hard wired logic.

The first controller may include a data classification unit that classifies the sensing data into vertical and horizontal sensing signals, a memory that stores data of the classified vertical and horizontal sensing signals, a touch state check unit that checks the touch occurrence of the sensing units based on the vertical sensing signal from the memory, and a stable state unit that determines whether or not the sensing signals are in a desired range based on the sensing signals from the memory.

The touch detection unit may further include a register that stores values of a plurality of flags.

The plurality of flags may include a memory state flag that represents that all the horizontal and vertical sensing signals are stored in the memory, a wakeup flag that controls an operation of the second controller, an unstable state flag that represents whether or not the sensing signals are in the desired range, and a touch state flag that represents whether or not the sensing units are touched.

The wakeup flag may have an activated value when the sensing units are determined to be in a touched state according to a result of checking the touched state or when the sensing signal is not determined to be in the desired range by the stable state unit.

When the wakeup flag is in the activated state, the second controller may be powered to determine the touch occurrence and the touch positions on the sensing units based on the sensing data and control the sensing signals to be in the desired range.

When the sensing signal is not determined to be in the desired range by the stable state unit, the unstable state flag may have the activated state value.

After the touch detection unit is applied with an enable signal and powered, the value of the unstable state flag may have the activated state value.

When the sensing units are determined to be touched, the touch state flag may have the activated state value.

When the data classification unit stores all the horizontal and vertical data in the memory, the memory state flag may have the activated state value.

The touch detection unit may further include an interface, and the interface may be an SPI (serial peripheral interface).

Each of the sensing units may include a variable capacitor of which capacitance varies with external pressure, and a reference capacitor having a predetermined value of capacitance.

Another embodiment of the invention provides a method of controlling a touch detection unit based on touch of a display panel, the touch detection unit having first and second controllers to determine touch occurrence and touch positions based on sensing signals generated from a plurality of sensing units, the method including: an initializing step of determining whether or not an external enable signal is applied, and when the enable signal is applied, supplying power to initialize an operation; a controlling step of, in the first controller, classifying the sensing signals, storing the classified sensing signals in a memory, determining whether or not the sensing units are touched and whether or not the sensing signals are in a desired range based on the sensing signals, and setting a wakeup flag to an activated state; and a controlling step of, in the second controller, when the value of the wakeup flag is in an activated state, performing a stabilizing operation to allow the sensing signals to be in the desired range and an operation of determining the touch occurrence and the touch positions on the sensing units.

In the above embodiment of the invention, the initializing step may further include setting the values of the wakeup flag and the unstable state flag to be in the activated state so as to allow the second controller to perform the stabilizing operation.

The controlling step in the first controller may include: classifying the sensing signals into vertical and horizontal sensing signals, storing the classified vertical and horizontal sensing signals in the memory, and when the storing is completed, changing the value of the memory state flag into the activated state; when the wakeup flag is in the activated state, allowing the second controller to operate; when the wakeup flag is not in the activated state, determining whether or not the sensing signal is in the desired range; when the sensing signal is in the desired range, determining whether or not the sensing units are touched; when the sensing units are not touched, performing the operation of classifying the sensing signals; when the sensing units are touched, changing the wakeup flag and the touch state flag into the activated state; and when the sensing signals are not in the desired range, changing the wakeup flag and the touch state flag into the activated state.

The controlling step in the second controller includes: determining whether or not the memory state flag is in the activated state; when the memory state flag is in the activated state, determining whether or not the unstable state flag is in the activated state; when the unstable state flag is in the activated state, setting the memory state flag to the inactivated state; determining whether or not the sensing signal is in the desired range, and when the sensing signal is in the desired range, outputting a control signal for changing a level of the sensing signal; when the sensing signals are in the desired range, setting the wakeup flag to the inactivated state and shutting down power; when the unstable state flag is in the inactivated state, determining whether or not the touch state flag is in the activated state; when the touch state flag is in the inactivated state, setting the wakeup flag to the inactivated state and shutting down power; when the touch state flag is in the activated state, determining the touch occurrence and the touch positions on the sensing units and generating touch information; when the sensing units are touched, determining whether or not the memory state flag is in the activated state; and when the sensing units are not touched, setting the wakeup flag to the inactivated state and shutting down power.

BRIEF DESCRIPTION OF THE DRAWINGS

Embodiments of the invention will be described in detail with reference to the accompanying drawings to aid in understanding various advantages associated with various embodiments of the present invention.

DETAILED DESCRIPTION OF THE EMBODIMENTS

Various embodiments of the invention will be described more fully hereinafter with reference to the accompanying drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 1:
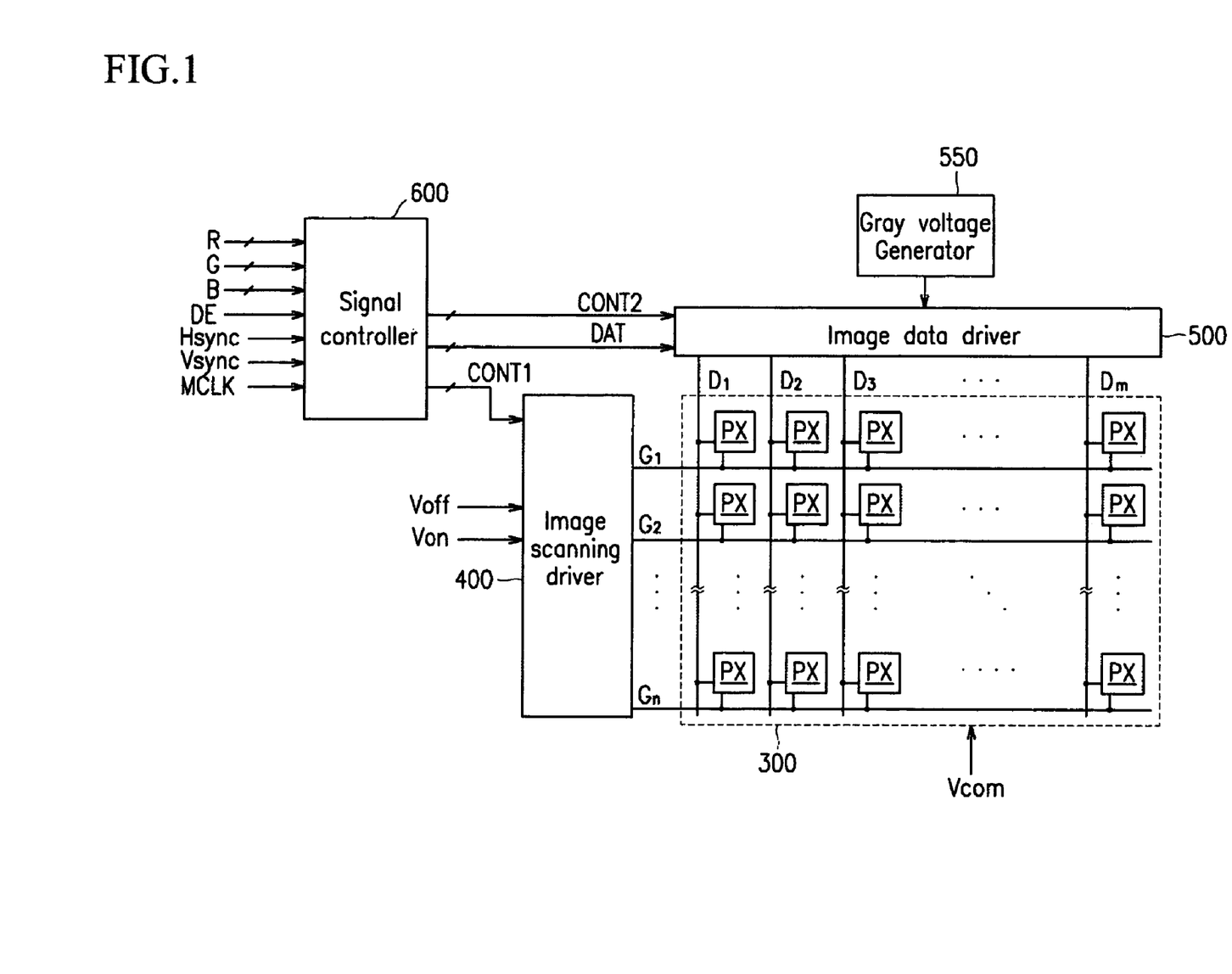
FIG. 1 is a block diagram showing a liquid crystal display device and pixels thereof according to an embodiment of the invention.
Figure 3:
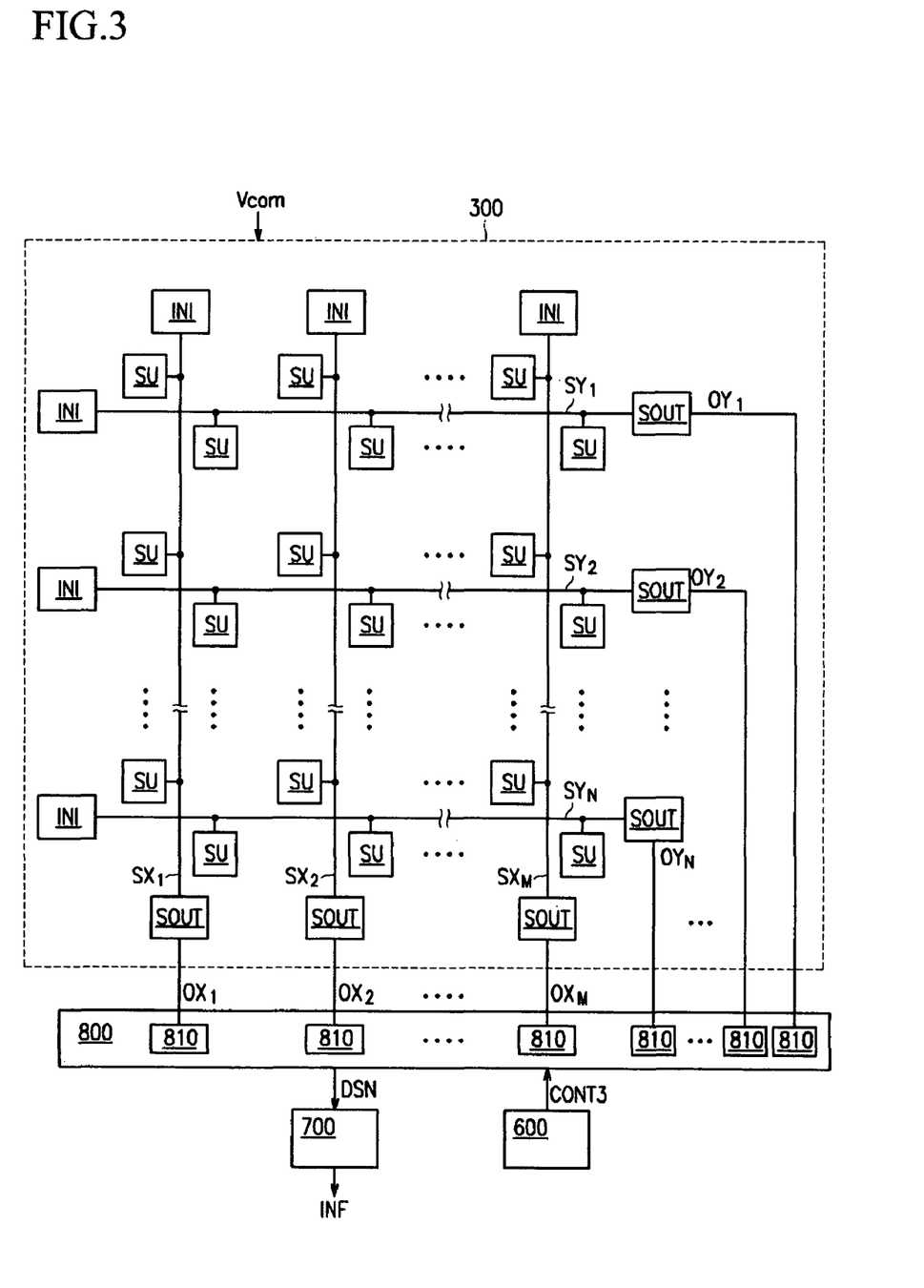
FIG. 3 is a block diagram showing a liquid crystal display device and sensing units thereof according to an embodiment of the invention.

Referring to FIGS. 1 and 3, the liquid crystal display device according to an embodiment of the invention includes a liquid crystal panel assembly 300, an image scanning driver 400 connected to the liquid crystal panel assembly 300, an image data driver 500, a sensing signal processor 800, a gray voltage generator 550 connected to the image data driver 500, a touch detection unit 700 connected to the sensing signal processor 800, and a signal controller 600 that controls the aforementioned components.

Referring to FIGS. 1 to 4, the liquid crystal panel assembly 300 includes a plurality of display signal lines $G_1$ to $G_n$ and $D_1$ to $D_m$, a plurality of pixels PX that are connected to the display signal lines $G_1$ to $G_n$ and $D_1$ to $D_m$ and arranged substantially in a matrix, a plurality of sensing signal lines $SY_1$ to $SY_N$ and $SX_1$ to $SX_M$, and RL, a plurality of sensing units SU that are connected to the sensing signal lines $SY_1$ to $SY_N$ and $SX_1$ to $SX_M$ and arranged substantially in a matrix, a plurality of reset signal input units INI each of which is connected to one end of each of the sensing signal lines $SY_1$ to $SY_N$ and $SX_1$ to $SX_M$, a plurality of sensing signal output units SOUT each of which is connected to the other end of each of the sensing signal lines $SY_1$ to $SY_N$ and $SX_1$ to $SX_M$, and a plurality of output data lines $OY_1$ to $OY_N$ and $OX_1$ to $OX_M$ each of which is connected to each of the sensing signal output units SOUT.

Figure 2:
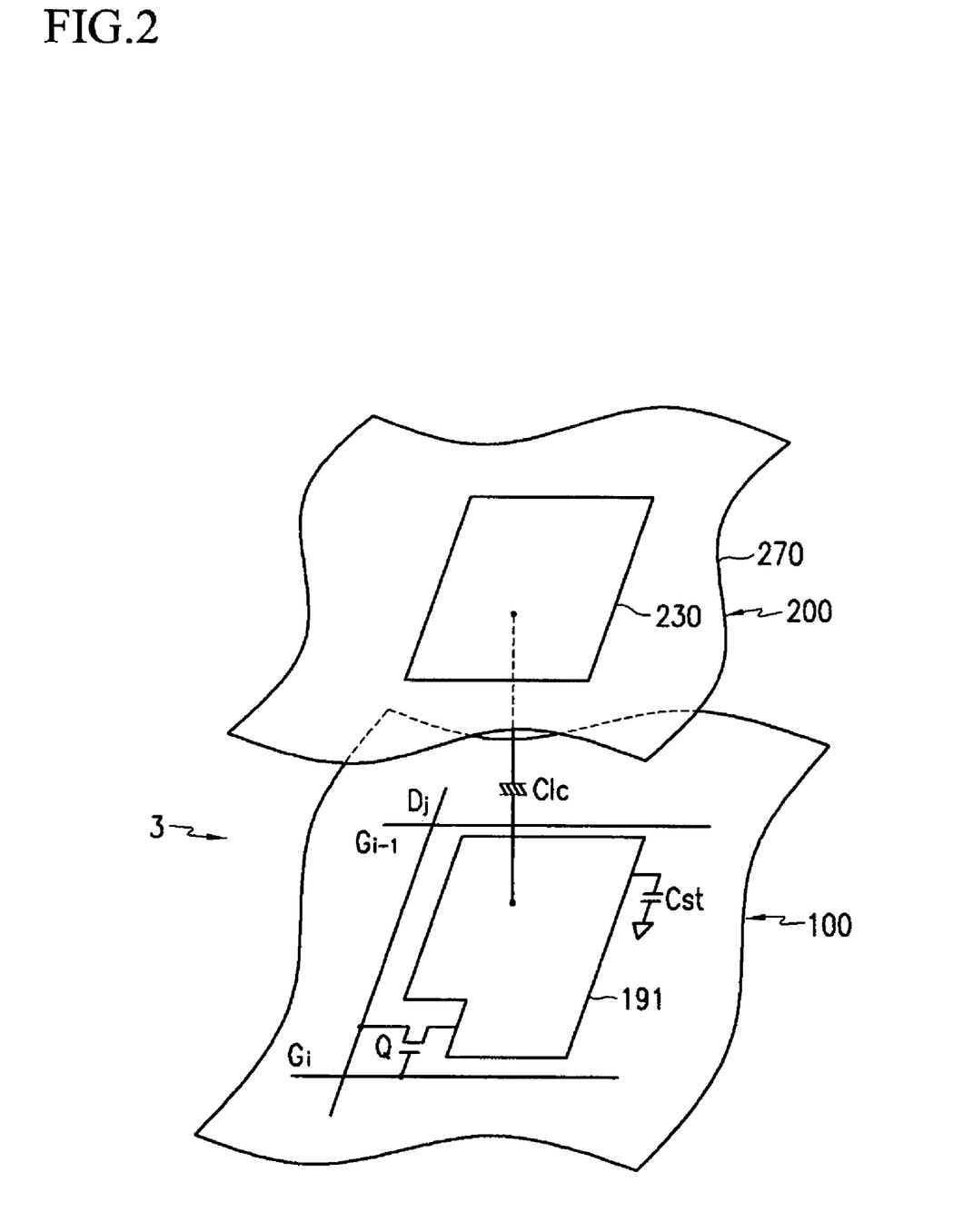
FIG. 2 is an equivalent circuit diagram of one pixel of a liquid crystal display device according to an embodiment of the invention.
Figure 5:
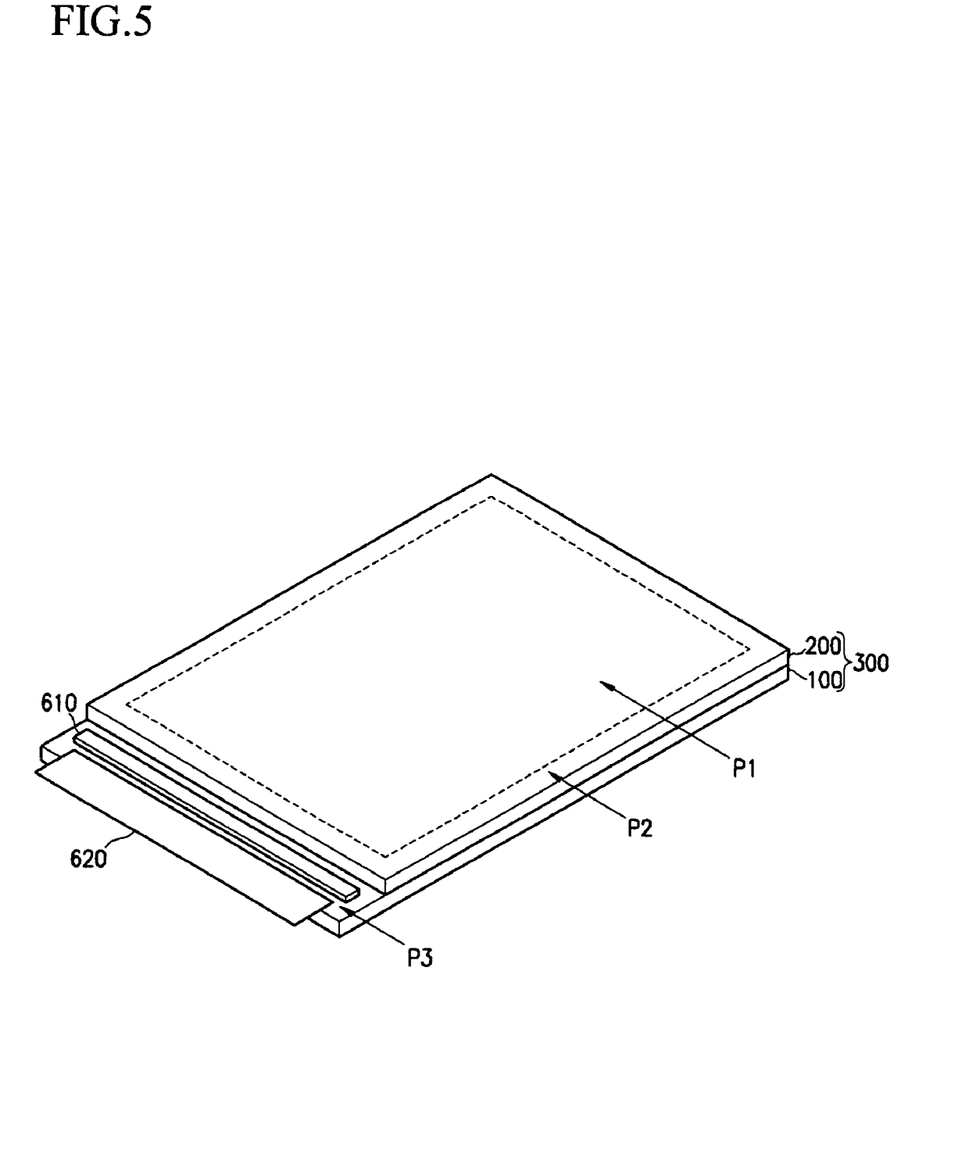
FIG. 5 is a schematic diagram showing a liquid crystal display device according to an embodiment of the invention.

Referring to FIGS. 2 and 5, the liquid crystal panel assembly 300 includes a thin film transistor array panel 100 and a common electrode panel 200 that face each other, a liquid crystal layer 3 interposed therebetween, and spacers (not shown) that form a gap between the two display panels 100 and 200 and that can be slightly compressed and deformed.

The display signal lines $G_1$ to $G_n$ and $D_1$ to $D_m$ include a plurality of image scanning lines $G_1$ to $G_n$ that transmit image scanning signals and image data lines $D_1$ to $D_m$ that transmit image data signals. The sensing signal lines $SY_1$ to $SY_N$, $SX_1$ to $SX_M$, and RL include a plurality of horizontal sensing data lines $SY_1$ to $SY_N$ and a plurality of vertical sensing data lines $SX_1$ to $SX_M$ that transmit sensing data signals, and a plurality of reference voltage lines RL that transmit reference voltages having high and low levels and swing between the high and low levels in a predetermined period. In one embodiment, the reference voltage lines RL may be omitted.

The image scanning lines $G_1$ to $G_n$ and the horizontal sensing data lines $SY_1$ to $SY_N$ are disposed to extend substantially in the row direction in parallel to each other. The image data lines $D_1$ to $D_m$ and the vertical sensing data lines $SX_1$ to $SX_M$ are disposed to extend substantially in the column direction in parallel to each other. The reference voltage lines RL are disposed to extend in the row or column direction.

Each of pixels PX includes a switching element Q that is connected to one of the image scanning lines and one of the image data lines $G_1$ to $G_n$ and $D_1$ to $D_m$, a liquid crystal capacitor Clc connected to the switching element Q, and a storage capacitor Cst. In one embodiment, the storage capacitor Cst may be omitted.

The switching element Q may be implemented as a three terminal element such as a thin film transistor disposed on the thin film transistor array panel 100. The switching element Q has a control terminal connected to one of the image scanning lines $G_1$ to $G_n$, an input terminal connected to one of the image data lines $D_1$ to $D_m$, and an output terminal connected to the liquid crystal capacitor Clc and the storage capacitor Cst. In one embodiment, the thin film transistor may include amorphous silicon or polysilicon.

The liquid crystal capacitor Clc uses a pixel electrode 191 of the thin film transistor array panel 100 and a common electrode 270 of the common electrode panel 200 as two terminals, and the liquid crystal layer 3 interposed between the two electrodes 191 and 270 serves as a dielectric material. The pixel electrode 191 is connected to the switching element Q. The common electrode 270 is disposed on the entire surface of the common electrode panel 200 and is supplied with a common voltage Vcom. In another embodiment, the common electrode 270 may be disposed on the thin film transistor array panel 100. In this case, at least one of the two electrodes 191 and 270 may be formed in a shape of a line or a bar. In one embodiment, the common voltage Vcom is a constant DC voltage having a predetermined level, of approximately 0V.

The storage capacitor Cst having an auxiliary function for the liquid crystal capacitor Clc is constructed by overlapping separate lines (not shown) disposed on the thin film transistor array panel 100 and each of the pixel electrodes 191 with an insulator interposed therebetween, and each of the separate signal lines is applied with a predetermined voltage such as a common voltage Vcom. Alternatively, the storage capacitor Cst may be constructed by overlapping with the pixel electrode 191 and an adjacent image scanning signal line called a previous image scanning line with the insulator interposed therebetween.

In order to implement a color display, each of the pixels PX uniquely displays a primary color (spatial division), or each of the pixels PX alternately displays the primary colors according to time (temporal division). As a result, a desired color can be obtained by a spatial or temporal sum of the primary colors. An example of the primary colors is three primary colors such as red, green, and blue. FIG. 2 shows an example of the spatial division. As shown in the figure, each of the pixels PX includes a color filter 230 for representing one of the primary colors, which is provided to a region of the common electrode panel 200 corresponding to the pixel electrode 191. Unlike the color filter 230 shown in FIG. 2, the color filter 230 may be provided on or under the pixel electrode 191 of the thin film transistor array panel 100. At least one polarizer (not shown) for polarizing light is attached on an outer surface of the liquid crystal panel assembly 300.

Figure 4:
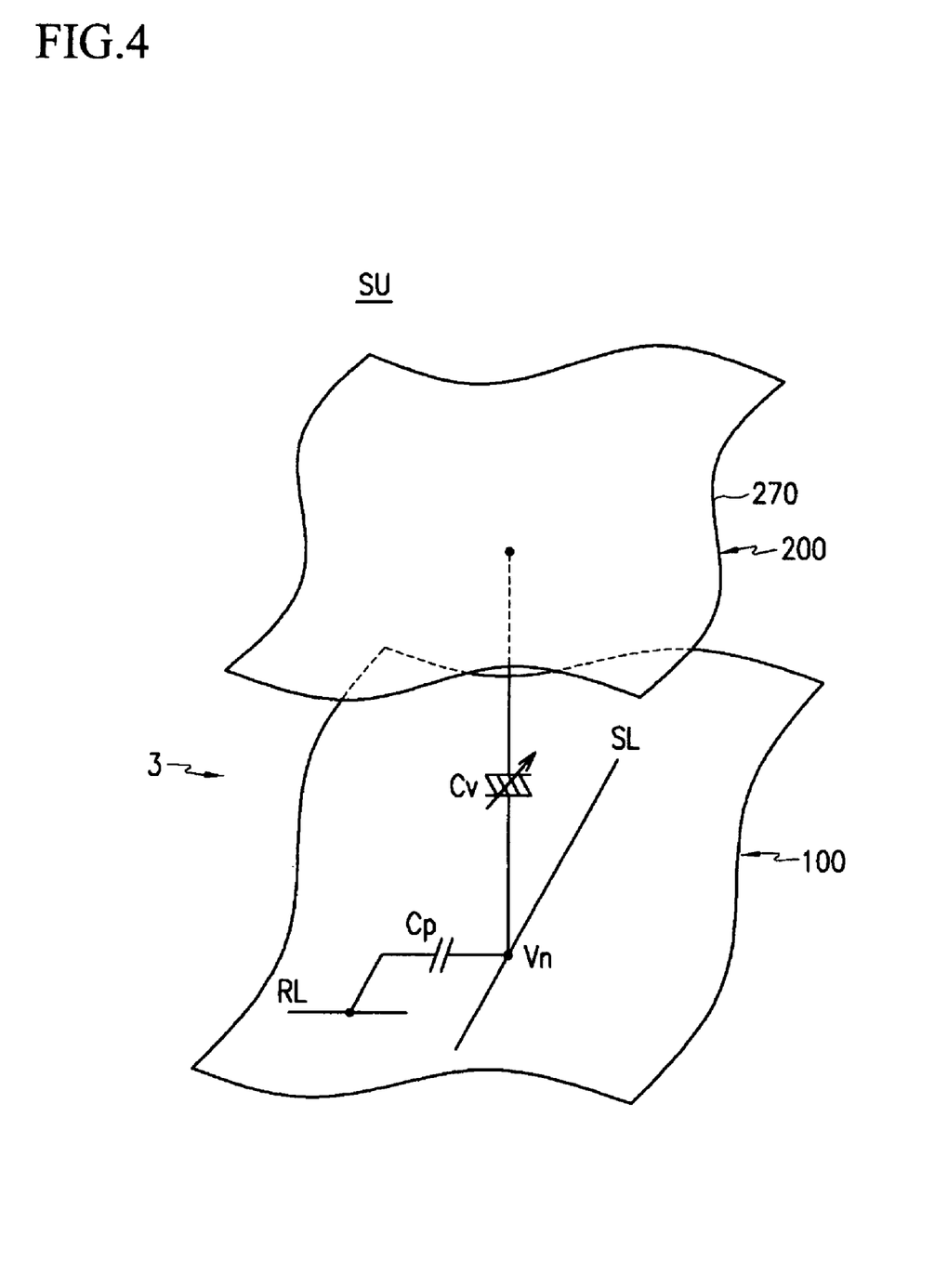
FIG. 4 is an equivalent circuit diagram of one sensing unit of a liquid crystal display device according to an embodiment of the invention.

As shown in FIG. 4, each of the sensing units SU includes a variable capacitor Cv connected to a horizontal or vertical sensing data line (hereinafter, a sensing data line) denoted by reference numeral SL, and a reference capacitor Cp connected between the sensing data line SL and the reference voltage line RL.

The reference capacitor Cp is constructed by overlapping the sensing data line and the reference voltage line RL of the thin film transistor array panel 100 with an insulator (not shown) interposed therebetween.

The variable capacitor Cv uses the sensing data line SL of the thin film transistor array panel 100 and the common electrode 270 of the common electrode panel 200 as two terminals, and the liquid crystal layer 3 interposed between the two terminals serves as a dielectric material. The capacitance of the variable capacitor Cv varies with an external stimulus such as pressure applied to the liquid crystal panel assembly 300 by a user's touch. When the pressure is applied on the common electrode panel 200, the spacers are compressed and deformed, so that a distance between the two terminals varies. As a result, the capacitance of the variable capacitor Cv varies. A node voltage Vn between the reference capacitor Cp and the variable capacitor Cv highly depends on the capacitance of the variable capacitor Cv. As a result, the node voltage varies when the capacitance of the variable capacitor CV varies. The node voltage Vn is a sensing data signal and is transmitted through the sensing data line SL. The user's touch can be determined based on the sensing data signal. The distance between two terminals of the reference capacitor Cp is maintained constant, so that the reference capacitor Cp exhibits a substantially constant capacitance. Therefore, the sensing data signal can have a voltage level in a predetermined range. As a result, the occurrence and position of a user's touch can be easily determined.

Each of the sensing units SU is disposed between the adjacent pixels PX. Each of the sensing units SU is connected to one of the horizontal sensing data lines $SY_1$ to $SY_N$ and one of vertical sensing data lines $SX_1$ to $SX_M$. In one embodiment, density of pairs of the sensing units SU disposed in the vicinity of intersections the horizontal and vertical sensing data lines $SY_1$ to $SY_N$ and $SX_1$ to $SX_M$ may be about ¼ of a density of dots. Here, one dot includes three pixels PX that are arranged in parallel to each other to represent three primary colors. In addition, one dot represents one color and becomes a unit of resolution of a liquid crystal display device. Alternatively, one dot may include four or more pixels PX. In this case, each of the pixels PX can represent one of three primary colors and white.

As an example of the case where the density of pairs of sensing units SU is ¼ of the density of dots, horizontal and vertical resolutions of pairs of sensing units SU may be ½ of horizontal and vertical resolutions of a liquid crystal display device, respectively. In this case, there may be a pixel row or a pixel column having no sensing unit (SU).

A liquid crystal display device having the aforementioned density of sensing units (SU) and the aforementioned density of dots may be employed in character recognition or other applications requiring high accuracy. The resolution of the sensing units SU may be higher or lower in other embodiments.

In one embodiment, the space occupied by the sensing units SU may decrease relative to the space occupied by the sensing data lines SL in order to minimize a decrease in the aperture ratio of the pixel PX.

Figure 6:
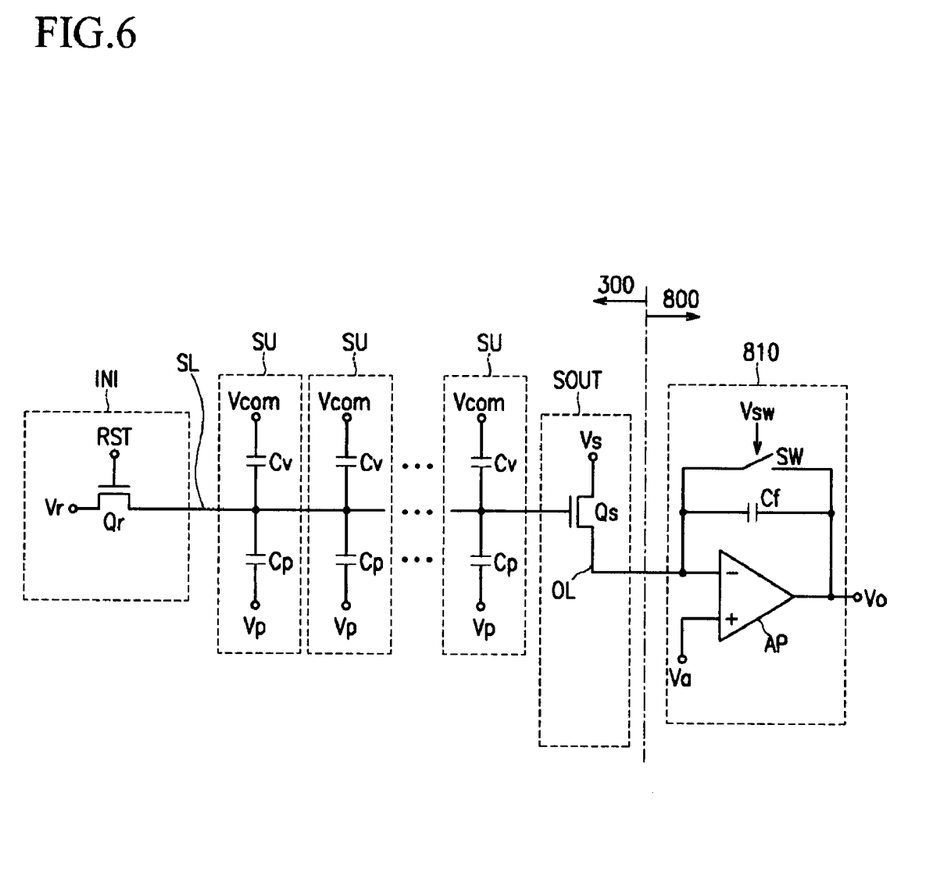
FIG. 6 is an equivalent circuit diagram of a plurality of sensing units connected to one sensing data line in a liquid crystal display device according to an embodiment of the invention.

As shown in FIG. 6, all the reset signal input units INI have substantially the same structure, and each of the reset signal input units INI includes a reset transistor Qr. The reset transistor Qr is a three terminal element such as a thin film transistor. The reset transistor Qr has a control terminal connected to a reset control signal RST, an input terminal connected to a reset voltage Vr, and an output terminal connected to a sensing data line SL ($SX_1$ to $SX_M$ or $SY_1$ to $SY_N$ in FIG. 3). The reset transistor Qr is disposed in an edge region P2 of the liquid crystal panel assembly 300 where the pixels are not disposed. The reset transistor Qr supplies the reset voltage Vr to the sensing data line SL according to the reset control signal RST.

In addition, all the sensing signal output units SOUT have substantially the same structure. Each of the sensing signal output units SOUT includes an output transistor Qs. The output transistor Qs is also a three terminal element such as a thin film transistor. The output transistor Qs has a control terminal connected to the sensing data line SL, an input terminal connected to an input voltage Vs, and an output terminal connected to the output data line OL. The output transistor Qs is also disposed in the edge region P2 of the liquid crystal panel assembly 300. The output transistor Qs generates an output signal based on the sensing data signal that flows through the sensing data line SL. As an example of the output signal, there is a current signal. Alternatively, the output transistor Qs may generate a voltage signal.

The reset transistor Qr and the output transistor Qs may be implemented as thin film transistors and formed together with the switching element Q.

The output data lines $OY_1$ to $OY_N$ and $OX_1$ to $OX_M$ include a plurality of horizontal and vertical output data lines $OY_1$ to $OY_N$ and $OX_1$ to $OX_M$ connected to the horizontal and vertical sensing data lines $SY_1$ to $SY_N$ and $SX_1$ to $SX_M$ through the sensing signal output units SOUT. The output data lines $OY_1$ to $OY_N$ and $OX_1$ to $OX_M$ are connected to the sensing signal processor 800. The output data lines $OY_1$ to $OY_N$ and $OX_1$ to $OX_M$ transmit output signals of the sensing signal output units SOUT to the sensing signal processor 800. The horizontal and vertical output data lines $OY_1$ to $OY_N$ and $OX_1$ to $OX_M$ are disposed to extend substantially in the column direction in parallel to each other.

Returning to FIGS. 1 and 3, the gray voltage generator 550 generates two sets of gray voltages (reference gray voltage sets) corresponding to transmittance of pixels. One gray set has a positive value with respect to the common voltage Vcom, and the other gray voltage set has a negative value with respect to the common voltage Vcom.

The image scanning driver 400 is connected to the image scanning lines $G_1$ to $G_n$ of the liquid crystal panel assembly 300 to apply image scanning signals constructed with a combination of a gate-on voltage Von for turning on the switching element Q and a gate-off voltage Voff for turning off the switching element Q to the image scanning lines $G_1$ to $G_n$.

In one embodiment, the image data driver 500 is connected to the image data lines $D_1$ to $D_m$ of the liquid crystal panel assembly 300 to select the gray voltages from the gray voltage generator 550 and apply the selected gray voltages as the image data signals to the image data lines $D_1$ to $D_m$. In another embodiment, the gray voltage generator 550 applies a predetermined number of reference gray voltages but not voltages for the entire grays. In this case, the image data driver 500 divides the reference gray voltages to generate the voltages for the entire grays and selects the image data signal among the voltages for the entire grays.

The sensing signal processor 800 includes a plurality of amplifying units 810 connected to the output data lines $OY_1$ to $OY_N$ and $OX_1$ to $OX_M$ of the liquid crystal panel assembly 300.

As shown in FIG. 6, a plurality of the amplifying units 810 have substantially the same structure. Each amplifying unit 810 includes an amplifier AP, a capacitor Cf, and a switch SW. The amplifier AP has an inversion terminal (−), a non-inversion terminal (+), and an output terminal. The inversion terminal (−) is connected to the output data line OL, the capacitor Cf and the switch SW are connected between the inversion terminal (−) and the output terminal, and the non-inversion terminal (+) is connected to a reference voltage Va. The amplifier AP and capacitor Cf provides a current integrator to integrate the output current from the output transistor Qs in a predetermined time interval, thereby generating a sensing signal Vo.

The sensing signal processor 800 converts the analog sensing signal Vo from the amplifying units 810 to a digital signal by using an analog-to-digital converter (not shown) to generate a digital sensing signal DSN.

The touch detection unit 700 receives the digital sensing signal DSN from the sensing signal processor 800 and performs a predetermined process to determine whether a touch has occurred and the touch position, and then outputs touch information INF to an external device. The touch detection unit 700 monitors operational states of the sensing units SU based on the digital sensing signal DSN so as to control signals applied to the sensing units SU. The touch detection unit 700 is described later in detail.

The signal controller 600 controls operations of the image scanning driver 400, the image data driver 500, the gray voltage generator 550, and the sensing signal processor 800.

In one embodiment, the drivers 400, 500, 550, 600, 700, and 800 may be formed in at least one IC chip that is attached directly on the liquid crystal panel assembly 300. Alternatively, the drivers 400, 500, 550, 600, 700, and 800 may be mounted on a flexible printed circuit film (not shown) and attached in the form of a tape carrier package (TCP) on the liquid crystal panel assembly 300, or mounted on a separate printed circuit board (PCB) (not shown). As a further alternative, the drivers 400, 500, 550, 600, 700, and 800 together with the signal lines $G_1$ to $G_n$, $D_1$ to $D_m$, $SY_1$ to $SY_N$, $SX_1$ to $SX_M$, $OY_1$ to $OY_N$, and $OX_1$ to $OX_M$, RL and thin film transistors Q may be integrated into the liquid crystal panel assembly 300.

Referring to FIG. 5, the liquid crystal panel assembly 300 is divided into a display area P1, an edge region P2, and an exposed region P3. Most of the pixel PX, sensing units SU and signal lines $G_1$ to $G_n$, $D_1$ to $D_m$, $SY_1$ to $SY_N$, $SX_1$ to $SX_M$, $OY_1$ to $OY_N$, and $OX_1$ to $OX_M$, RL are disposed in the display area P1. The common electrode panel 200 includes a light blocking member (not shown) such as a black matrix. The light blocking member covers most of the edge region P2 to block external light. Since the common electrode panel 200 is smaller than the thin film transistor array panel 100, a portion of the thin film transistor array panel 100 is exposed, so that the exposed region P3 is formed. On the exposed region P3, a single chip 610 is mounted, and a flexible printed circuit (FPC) board 620 is attached.

The single chip 610 includes the drivers for driving the liquid crystal display device such as the image scanning driver 400, the image data driver 500, the gray voltage generator 550, the signal controller 600, the touch detection unit 700, and the sensing signal processor 800. Since the drivers 400, 500, 550, 600, 700, and 800 are integrated into the single chip 610, the mounting area can be reduced, and the power consumption can be lowered. As needed, at least one of the drivers or at least one circuit element thereof may be disposed outside the single chip 610.

The image signal lines $G_1$ to $G_n$ and $D_1$ to $D_m$ and the sensing data lines $SY_1$ to $SY_N$ and $SX_1$ to $SX_M$ may be constructed to extend to the exposed region P3 to be connected to the associated drivers 400, 500, and 800.

The FPC board 620 receives signals from external devices and transmits the signals to the single chip 610 or liquid crystal panel assembly 300. For convenience of connection, the end portion of the FPC board 620 may be generally constructed with connectors (not shown).

Displaying and sensing operations of the liquid crystal display device will be further described below.

The signal controller 600 receives input image signals R, G, and B and input control signals for controlling display thereof from an external device (not shown). The input image signals R, G, and B contain luminance information f the pixels PX. The luminance can be represented with a predetermined number of grays, for example, 1024 ($=2^{10}$), 256 ($=2^8$), or 64 ($=2^6$) grays. The input control signals may include, for example, a vertical synchronization signal Vsync, a horizontal synchronizing signal Hsync, a main clock signal MCLK, and a data enable signal DE.

The signal controller 600 processes the input image signals R, G, and B according to operating conditions of the liquid crystal panel assembly 300 and the image data driver 500 based on the input image signals R, G, and B and the input control signal to generate image scanning control signals CONT1, image data control signals CONT2, and sensing data control signals CONT3. The signal controller 600 then transmits the image scanning control signals CONT1 to the image scanning driver 400, the image data control signals CONT2 and the processed image signal DAT to the image data driver 500, and the sensing data control signals CONT3 to the sensing signal processor 800.

The image scanning control signals CONT1 include a scanning start signal STV for indicating scan starting and at least one clock signal for controlling output of a gate-on voltage Von. The image scanning control signals CONT1 may also include an output enable signal OE for defining a duration time of the gate-on voltage Von.

The image data control signals CONT2 include a horizontal synchronization start signal STH for indicating data transmission for a row of pixels PX, a load signal LOAD to apply image data voltages to the image data lines $D_1$ to $D_m$, and a data clock signal HCLK. The image data control signals CONT2 may further include an inversion signal RVS for inverting the polarity of the image data voltage with respect to the common voltage Vcom.

In response to the image data control signals CONT2 from the signal controller 600, the image data driver 500 receives the digital image signals DAT for a row of the pixels PX, selects the gray voltages corresponding to the digital image signals DAT, converts the digital image signals DAT to analog image data voltages, and applies the analog image data voltages to the image data lines $D_1$ to $D_m$.

In response to the image scanning control signals CONT1 from the signal controller 600, the image scanning driver 400 applies the gate-on voltage Von to the image scanning lines $G_1$ to $G_n$ to turn on the switching elements Q connected to the image scanning lines $G_1$ to $G_n$. As a result, the image data voltages applied to the image data lines $D_1$ to $D_m$ are applied to the pixels PX connected to the turned-on switching elements Q.

A difference between the image data voltage and the common voltage Vcom is represented with a charge voltage of the liquid crystal capacitor Clc (pixel voltage). Alignment of the liquid crystal molecules varies according to the intensity of the pixel voltage, so that polarization of light passing through the liquid crystal layer 3 changes. The change in the polarization results in a change in transmittance of the light due to the polarizer attached to the liquid display panel assembly 300, so that a desired image can be displayed.

In units of one horizontal period (1H), that is, one period of the horizontal synchronization signal Hsync and the data enable signal DE, the aforementioned operations may be repetitively performed to sequentially apply the gate-on voltages Von to all the image scanning lines $G_1$ to $G_n$, so that the image data voltages are applied to all the pixels PX. As a result, one frame of image may be displayed.

When one frame ends, the next frame starts, and a state of the inversion signal RVS applied to the image data driver 500 is controlled so that the polarity of the image data voltage applied to each of the pixels PX is opposite to the polarity in the previous frame (frame inversion). At this time, even in one frame, according to the characteristics of the inversion signal RVS, the polarity of the image data voltage flowing through the one image data line may be inverted (e.g., row inversion or dot inversion), and the polarities of the image data voltages applied to one pixel row are equal to each other (e.g., column inversion or dot inversion). The sensing signal processor 800 writes the sensing data signals applied through the output data lines $OY_1$ to $OY_N$ and $OX_1$ to $OX_M$ once for each of frames in a porch period between the frames according to the sensing data control signals CONT3. In one embodiment, the sensing signal processor 800 performs a sensing operation in a period ahead of the vertical synchronization signal Vsync. In the period, because the sensing data signal is not strongly affected by the driving signals from the image scanning driver 400 and the image data driver 500, reliability of the sensing data signals can be improved. The reading operation is not necessarily performed every frame, and it may be performed once for a plurality of frames. In addition, two or more reading operations may be performed in one period. Alternatively, at least one reading operation may be performed at one frame of the period.

The reading operation for the sensing data signal is described below with reference to FIG. 6. The common voltage Vcom has high and low levels and swings between the high and low level in a period of 1H. The reset control signal RST has a turn-on voltage for turning on the reset transistor Qr and a turn-off voltage for turning off the reset transistor Qr. The gate-on and gate-off voltages Von and Voff may be used as the turn-on and turn-off voltages. Alternatively, other voltages may be used. The turn-on voltage of the reset control signal RST is applied when the common voltage Vcom is at a high level.

When the turn-on voltage is applied to the reset transistor Qr, the reset transistor Qr turns on to apply the reset voltage Vr from the input terminal to the sensing data line SL, so that the sensing data line SL is initialized with the reset voltage Vr. On the other hand, at the start of operations, when reference voltage Va is applied to the amplifying units 810, capacitor Cf of the amplifying units 810 is charged with the reference voltage Va, so that a magnitude of an output voltage Vo of an amplifier AP becomes equal to the reference voltage Va.

When the reset control signal RST has the turn-off voltage Voff, the sensing data line SL is in a floating state, and a voltage applied to the control terminal of the output transistor Qs changes in response to changes in the capacitance of the variable capacitor Cv and variations in the common voltage Vcom in response to the touching of the sensing units SU. The current of the sensing data signal flowing through the output transistor Qs changes in response to changes in the voltage applied to the central terminal of the output transitor Qs.

After the reset control signal RST is changed to exhibit gate-off voltage Voff, a switching signal Vsw is applied to switch SW, so that the voltage charged in the capacitor Cf is discharged.

After a predetermined time, the sensing signal processor 800 reads the sensing signal Vo. Preferably, the time in which the sensing signal Vo is read is set to be less than the time of 1H after the reset control signal RST becomes the turn-off voltage Voff. In one embodiment, the sensing signal Vo is read before the common voltage Vcom is changed into the high level which may be preferable because the sensing signal Vo changes according to a change in level of the common voltage Vcom.

Because the sensing data signal changes based on the reset voltage Vr, the sensing data signal always has a voltage level in a constant range. Therefore, the occurrence and position of a touch can be easily determined.

The turn-on voltage of the reset control signal RST may be applied when the common voltage Vcom is at the low level. In this case, after the common voltage Vcom is changed to the high level before the common voltage Vcom is changed to the low level, the sensing signal Vo is read. In addition, the reset control signal RST may be synchronized with an image scanning signal applied to the final image scanning line $G_n$.

In this manner, after the analog sensing data signals are read using the amplifying units 810, the sensing signal processor 800 converts the sensing signals Vo to the digital sensing signals DSN and transmits the digital sensing signals DSN to the touch detection unit 700.

The touch detection unit 700 performs suitable processes on the received digital sensing signals DSN to determine the occurrence and position of a touch, and transmits the results thereof to an external apparatus. The external apparatus transmits the image signals R, G, and B based on the results to the liquid crystal display device to display the results on a screen or menu selected by a user.

Operations of the touch detection unit 700 are described in detail with reference to FIGS. 7 to 9.

Figure 7:
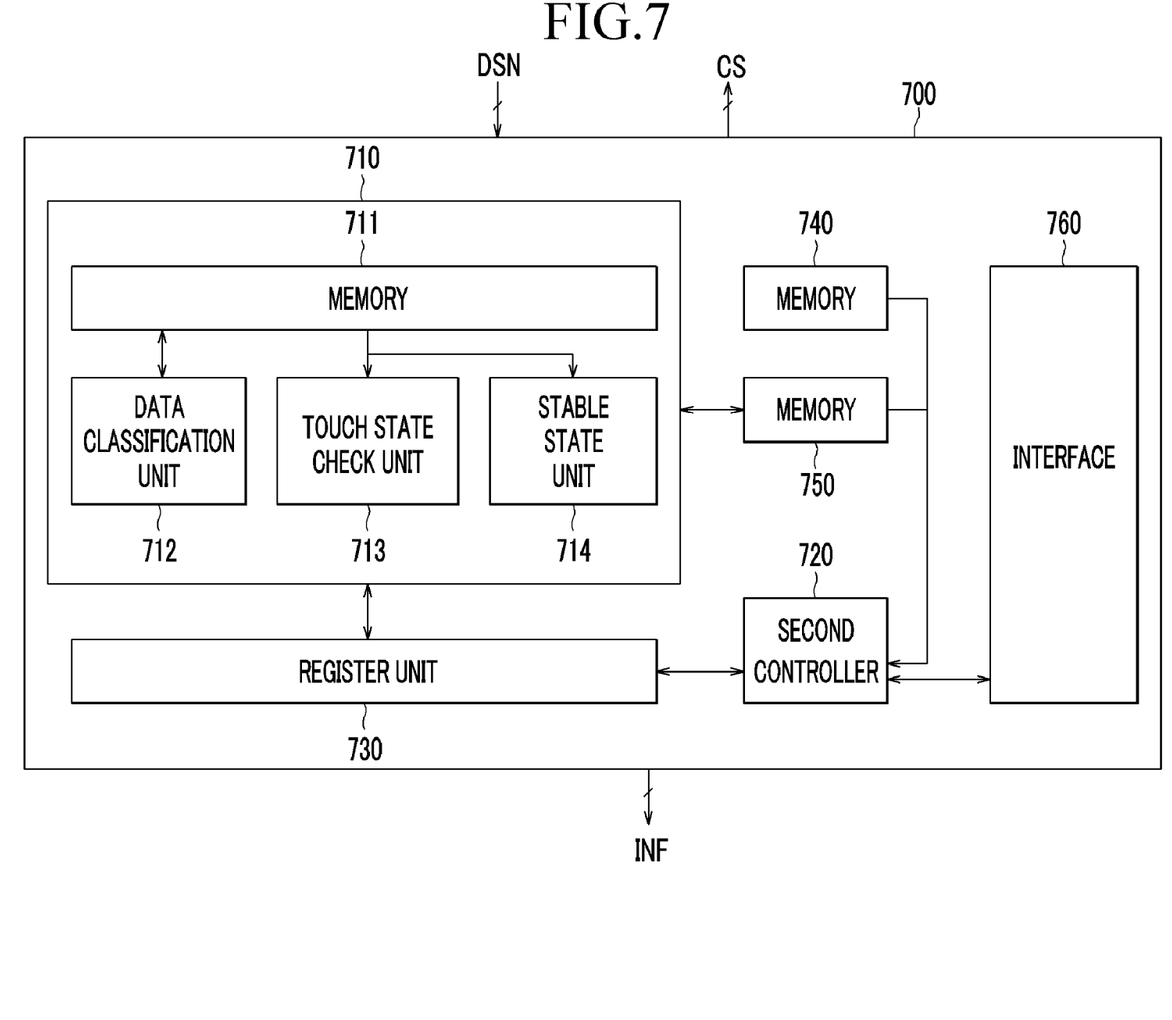
FIG. 7 is a block diagram showing a touch detection unit according to an embodiment of the invention.

As shown in FIG. 7, the touch detection unit 700 according to one embodiment of the invention includes first and second controllers 710 and 720, a register unit 730, memories 740 and 750, and an interface 760.

The first controller 710 includes a memory 711, a data classification unit 712, a touch state check unit 713, and a stable state unit 714. In one embodiment, these components are constructed with hard-wired logic. The first controller 710 may further include an initializing unit (not shown) that controls an initial operation of the touch detection unit 700.

The data classification unit 712 reads the digital sensing signals DSN from the sensing signal processor 800 and classifies the digital sensing signals DSN into vertical sensing signals and horizontal sensing signals. The data classification unit 712 transmits the vertical and horizontal sensing signals to the memory 711 to store the signals in the memory 711.

The touch state check unit 713 checks whether or not a touch operation has been performed by using one of the vertical or horizontal sensing signals.

The stable state unit 714 determines whether or not the sensing signals output from the sensing units SU are in a desired range. In the state that the sensing units SU is not touched, the stable state unit 714 can determine whether or not the output level of the sensing signals Vo are in the desired range, for example about 0.6V to about 0.8V, and whether or not the value of the sensing signals Vo are in a normal range.

The second controller 720 is a processor such as an ARM. The second controller 720 determines whether and where sensing units SU have been touched. When the output level of the sensing signals are not in the desired range, the second controller 720 adjusts the reset voltage Vr for the value of the sensing signals to be in the desired range.

The register unit 730 stores flag values indicating operational states of components. The memory 740 is a flash memory, and it stores operational programs that operate the second controller 720. The memory 750 is a data memory that stores various data required for the horizontal and vertical sensing signals and operations. The interface 760 may be a serial peripheral interface (SPI), and it transmits touch information INF or control signals CS from external apparatuses and receives required data and control signals from external apparatuses.

Control operations of the touch detection unit 700 are described below with reference to FIG. 8. Referring to FIG. 8, the control operations of the touch detection unit 700 include an initializing routine S10, a control routine S20 of the first controller 710, and a control routine S30 of the second controller 720.

Figure 8:
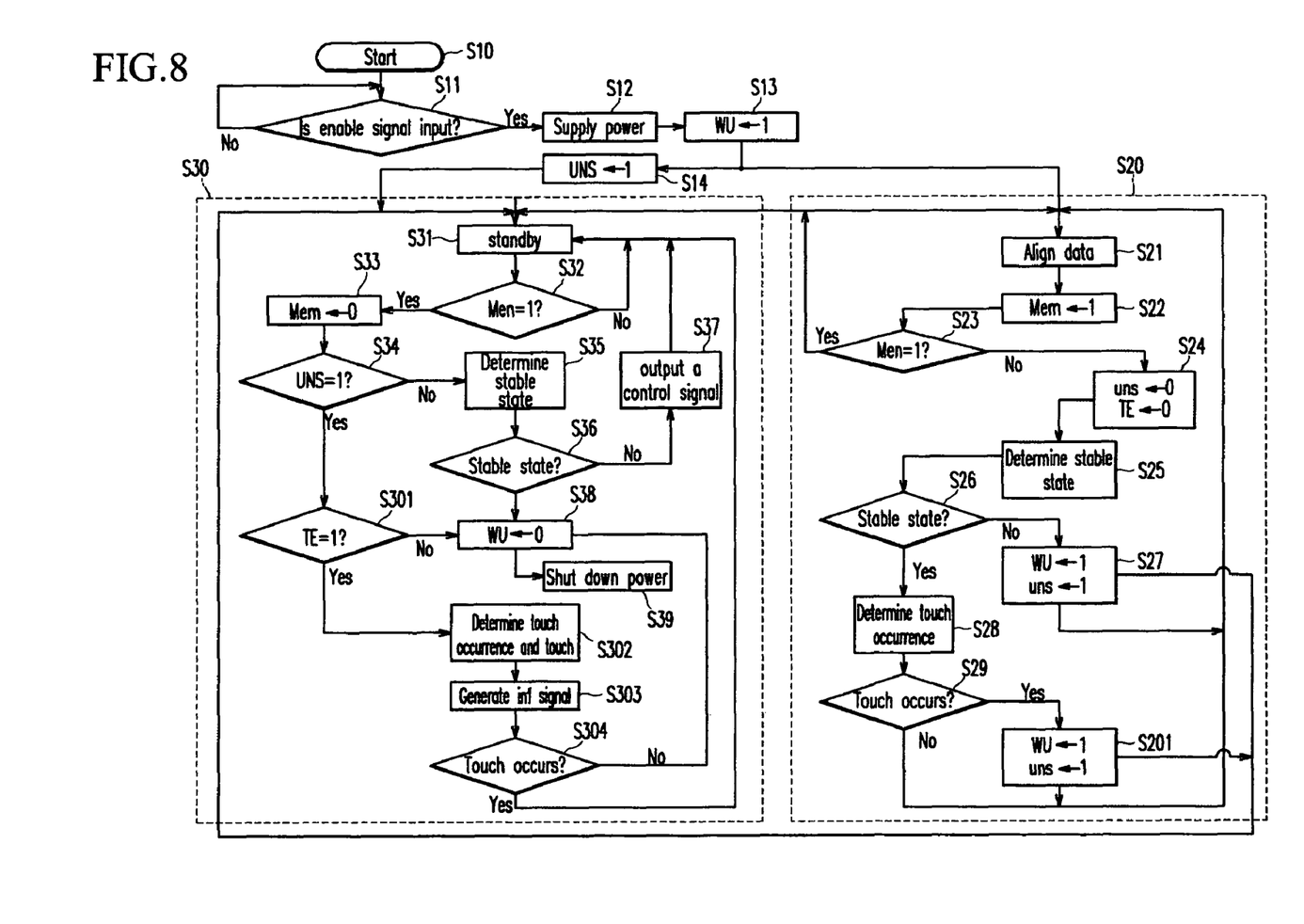
FIG. 8 is a flowchart showing operations of the touch detection unit shown in FIG. 7 according to an embodiment of the invention.

As shown in FIG. 8, when the operations start, the initializing unit determines whether or not a chip enable signal is applied to the touch detection unit 700 by an external apparatus such as the signal controller 600 (S11). When a chip enable signal is applied, the initializing unit supplies power for the operations of the touch detection unit 700, and sets a wakeup flag WU and an unstable state flag UNS each to an activated state (e.g., a value of 1). The values of the wakeup flag WU and the unstable flag UNS are stored in the register unit 730.

The wakeup flag WU controls the starting of the operation of the second controller 720. When the value of the wakeup flag WU is 1, the second controller 720 is awakened to perform a predetermined operation. The value 1 of the wakeup flag WU represents a normal state in which power is normally supplied. When the value of the wakeup flag WU is 0, the second controller 720 maintains a power saving state in which power is not supplied.

The unstable state flag UNS is a flag representing whether or not the value of the sensing signals Vo are in a desired range. The value of 1 for unstable state flag UNS represents a state in which the value of the sensing signal is not in the desired range. The value of 0 for the unstable state flag UNS represents a state in which the value of the sensing signal is in the desired range.

In order to accurately determine the occurrence of a touch received by the sensing units SU, the value of the sensing signal needs to be in a desired range. When the power supplying operation starts, in steps S13 and S14, the values of the wakeup flag WU and the unstable state flag UNS are set to 1, and before the operation of the sensing units SU is performed, the second controller 720 adjusts the reset voltage Vr to allow the value of the sensing signal to be in the desired range.

In this state, the operations of the first and second controllers 710 and 720 are then performed.

The operations of the first controller 710 will first be described below. After the wakeup flag WU is set to 1 in the step S13, the data classification unit 712 of the first controller 710 receives the digital sensing signals DSN input through the interface 760, classifies the digital sensing signals DSN into the horizontal sensing signals and the vertical sensing signals, and stores the horizontal and vertical sensing signals in the memory 711 (S21). It then sets a value of a memory state flag Mem to 1 (S22). The memory state flag Mem is a flag representing that all the horizontal and vertical sensing signals are stored in the first memory 711. The value 1 of the memory state flag Mem represents that the horizontal and vertical sensing signals are completely stored in the first memory 711. In this case, the second controller 720 can use the sensing signals stored in the memory 711. The value of the memory state flag Mem is also stored in the register unit 730.

Next, the first controller 710 determines whether or not the value of the wakeup flag WU is 1 (S23). Since the values of the wakeup flag WU and the unstable state flag UNS are previously set to 1 in the steps S13 and S14 to allow the sensing signals of the sensing units SU to be in the desired range at the time of the initial operation, the wakeup flag WU and the unstable state flag UNS are in the activated state. Therefore, at the time of the initial operation, the step S23 proceeds to a control routine S30 of the second controller 720 to perform steps S31 to S39, so that the reset voltage Vr is adjusted. As a result, the sensing signals of the sensing units SU are controlled to be in the desired range. The operations of the second controller 720 are described later in detail.

However, at the time of the initial operation, if the level adjusting operation on the initial sensing signals is completed and if the value of the wakeup flag WU is 0 in step S23, then step S23 proceeds to step S24. In this case, the stable state unit 714 of the first controller 710 sets the value of the unstable state flag UNS to 0, and the touch state check unit 713 sets a value of a touch state flag TE to 0 (S24). Thereafter, for the stable state determining operation on the sensing signals and the touch occurrence determining operation, the values of the associated flags UNS and TE are initialized to values of 0 so as to be in the inactivated state (S24).

Here, the touch state flag TE is a flag representing the touch occurrence on the sensing units SU. If the sensing unit SU has been touched, the value of the touch state flag TE will be set to 1. Otherwise, the value of the touch state flag TE will be set to 0. These values are also stored in the register unit 730. As described above, the touch occurrence may be determined by using the vertical sensing signal.

Next, the stable state unit 714 determines whether or not the value of the sensing signal applied from the interface 760 is in the desired range, and determines the output range of the sensing signals (S25, S26).

When the sensing signal is not in the desired range, the stable state unit 714 sets the values of the wakeup flag WU and the unstable state flag UNS to 1 (S27). Next, in the control routine S30, the stabilizing operation is performed, so that the second controller 720 adjusts the reset voltage Vr so as to allow the sensing signals to be in the desired range.

However, when the sensing signals are not in the desired range, the touch state check unit 713 determines whether a touch has occurred on the sensing units SU by using the horizontal sensing signals stored in the memory 711 (S28 and S29).

When a sensing unit SU has been touched, the touch state check unit 713 sets the values of the wakeup flag WU and the touch state flag TE to 1, and in the control routine S30, the second controller 720 determines the touched positions of the sensing units SU. The control routine S30 of the second controller 720 will be described below. In a standby state S31, the second controller 720 determines the value of the memory state flag Mem in a predetermined period (S32). When the value of the memory state flag Mem is 0, it will be determined that the operation of the data classification unit 712 is not completed, so the second controller 720 will be in the standby state (S31).

However, when the value of the memory state flag Mem is 1, the classifying operation of the input vertical and horizontal sensing signals DSN is completed, and the vertical and horizontal signals DSN are stored in the first memory 711. Therefore, the second controller 720 sets the value of the memory state flag Mem to 0 (S33). Thereafter, the second controller 720 reads the value of the unstable state flag UNS to determine whether or not the sensing signals are in the desired range (S34). In this manner, because the value of the memory state flag Mem is set to 0 in step S33, the data classification unit 712 allows new vertical and horizontal sensing signals to be stored in the memory 711.

When the value of the unstable state flag UNS is 0, that is, when the sensing signals are not determined to be in the desired range, the reset voltage Vr is maintained in an appropriate magnitude. Therefore, the second controller 720 determines whether or not the value of the touch state flag TE is 1 (S301) so as to determine the touch occurrence on the sensing units SU.

When the value of the touch state flag TE is 1, the touch state check unit 713 determines that a sensing unit SU has been touched. Therefore, the second controller 720 uses the vertical and horizontal sensing signals stored in the memory 750 to detect the touching of the sensing unit SU again, and then determines the touch position (S302). As a result, the second controller 720 generates the touch information INF corresponding to the actual touch occurrence and touch positions (S303).

When the value of the touch information INF is 1 representing that a sensing unit SU has not been touched (S304), the second controller 720 does not need to operate. Therefore, the value of the wakeup flag WU is set to 0 to represent the inactivated state, and the second controller 720 is powered down (i.e., shut down) to save power (S39). Accordingly, it is possible to prevent unnecessary power consumption by the second controller 720.

However, when the value of the touch information INF is 0 representing that the sensing units SU have been touched (S304), the second controller 720 continues to operate, so that the second controller 720 proceeds to the standby step S31 to determine the value of the memory state flag Mem.

When the value of the unstable state flag UNS is 1 in the step S34, the second controller 720 determines based on the sensing signals stored in the third memory 750 whether or not the sensing signals are in the desired range (S35 and S36).

When the sensing signals are in the desired range, the second controller 720 does not need to operate. Therefore, the value of the wakeup flag WU is set to 0, and then the power is powered down so that the power saving state proceeds (S39). Accordingly, it is possible to prevent unnecessary power consumption in the second controller 720.

However, when the values of the sensing signals are not in the desired range in the step S36, the second controller 720 outputs a control signal for adjusting the magnitude of the reset voltage Vr through the interface 760 (S36). An external component such as a voltage generator (not shown) adjusts the magnitude of the reset voltage Vr to allow the output levels of the sensing signals to be appropriate such that a touch received by the sensing units SU can be normally determined. The magnitude of the adjusted reset voltage Vr may be defined based on the sensing signal output when the sensing units SU are not touched.

In this manner, high power operations of the second controller remain in a shut-down state except for the operation of adjusting the desired range of the sensing signals or the operation of determining the occurrence and positions of touches received by the sensing units SU. Therefore, even where the second controller 720 is implemented with an ARM having a power consumption of about 40 mW, it may be possible to greatly reduce the power consumption.

The operational states of the first and the second controllers 710 and 720 are described below with reference to the timing diagram of FIG. 9. In FIG. 9, "S" indicates an operational time of the data classification unit 712, "H" indicates an operational time of the first controller 710, and "A" indicates an operational time of the second controller 720. In addition, "T" indicates an operational time of the interface 760.

Figure 9:
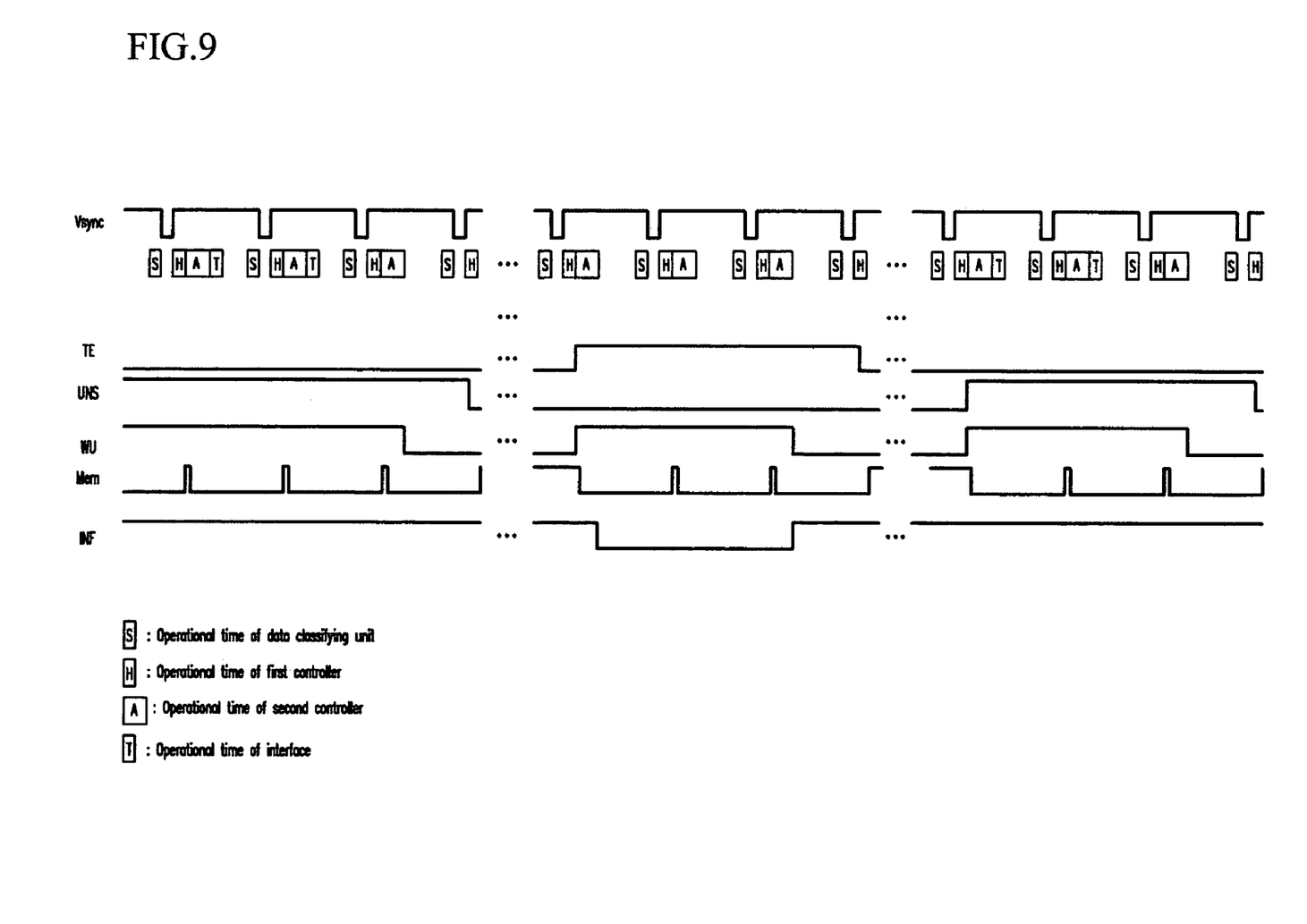
FIG. 9 is a timing diagram showing operations of the touch detection unit shown in FIG. 7 according to an embodiment of the invention.

In FIG. 9, the value of the memory state flag Mem is set to 1 during each frame, and the horizontal and vertical sensing signals are stored in the memory 711.

At the time of the initial operation, since the value of the unstable state flag UNS is 1, the second controller 720 needs to be awakened so as to control the stabilizing operation on the sensing signals, so that the value of the wakeup flag WU also becomes 1. After the second controller 720 performs the stabilizing operation on the sensing signals, the second controller 720 changes the value of the wakeup flag WU to 0 so as to be changed into the power saving state. After the operation of the second controller 720 is completed, the stable state unit 714 of the first controller 710 changes the value of the unstable state flag UNS to 0. In this case, in the first controller 710, the data classification unit 712 performs only the classifying operations on the vertical and horizontal sensing signals.

Next, when the value of the touch state flag TE is 1, the second controller 720 needs to be awakened so as to determine the touch occurrence and touch positions, so that the value of the wakeup flag WU also becomes 1. After the second controller 720 determines the occurrence and position of a touch, the second controller 720 changes the value of the wakeup flag WU to 0 so as to be changed into the power saving state. The touch period TT is included in this period, and when the value of the touch information INF is 0, the second controller 720 sets the state of the signal of the touch information INF to 0 in the touch interval TT so as to represent that the sensing unit SU is touched. After the operation of the second controller 720 is completed, the touch state check unit 713 of the first controller 710 changes the value of the touch state flag TE to 0.

In the aforementioned embodiments, the sensing units use the variable capacitor and the reference capacitor. However, other sensing elements may be employed. For example, a pressure sensing unit using the common electrode of the common electrode panel and the sensing data line of the thin film transistor array panel as two terminals of which at least one is designed to protrude and outputting the common voltage as an output signal when the two terminals are physically or electrically connected by a user's touch may be employed. Alternatively, an optical sensor that outputs different signals according to an intensity of light may be employed. In addition, the present invention may be applied to a display device including two or more kinds of sensing units.

In the aforementioned embodiments of the present invention, a liquid crystal display device is exemplified as a display device, but it is not limited thereto. A plasma display device, an organic light emitting diode (OLED) display, or other flat panel displays may be employed in the present invention.

According to various embodiments of the invention, a second controller (such as an ARM or other implementation with significant power consumption) is only operated when determining the occurrence and position of a touch received by the sensing units or during a stabilizing operation on an output voltage. At other times, the second controller is powered down to a power saving state. As a result, the power consumption of the second controller can be reduced, so that it is possible to reduce power consumption of a display device including sensing units.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a display panel;
    a plurality of pixels disposed on the display panel;
    a plurality of sensing units disposed on the display panel and adapted to generate a plurality of sensing signals in response to touches received by the sensing units;
    a sensing signal processor adapted to receive the sensing signals and generate sensing data in response to the sensing signals; and
    a touch detection unit having a first controller adapted to determine, based on the sensing data, whether or not a touch has been received by the sensing units and whether or not the sensing signals are in a desired range, and a second controller adapted to determine a position of the touch based on the sensing data and adapted to stabilize the sensing signals in the desired range;
    wherein the touch detection unit further comprises a register adapted to store values associated with a plurality of flags; and
    wherein the flags comprise an unstable state flag configured to indicate whether or not the sensing signals are in the desired range.

2. The display device of claim 1, wherein the second controller is an advanced RISC machine (ARM).

3. The display device of claim 1, wherein the first controller is implemented by hard-wired logic.

4. The display device of claim 3, wherein the first controller comprises:
    a data classification unit adapted to classify the sensing data into vertical and horizontal sensing signals;
    a memory adapted to store the vertical and horizontal sensing signals;
    a touch state check unit adapted to check whether a touch has occurred based on the vertical sensing signals stored by the memory; and
    a stable state unit adapted to determine whether or not the sensing signals are in the desired range.

5. The display device of claim 1, wherein the flags further comprise:
- a memory state flag configured to indicate whether all horizontal and vertical sensing signals are stored in the memory;
- a wakeup flag configured to control operation of the second controller; and
- a touch state flag configured to indicate whether or not a touch has been received by the sensing units.

6. The display device of claim 5, wherein the wakeup flag is set to an activated state if a touch has been received by the sensing units or if the sensing signals are not in the desired range.

7. The display device of claim 6, wherein the second controller is adapted to be powered up if the wakeup flag is in the activated state.

8. The display device of claim 5, wherein the unstable state flag is set to an activated state if the sensing signals are not in the desired range.

9. The display device of claim 8, wherein the unstable state flag is set to the activated state if the touch detection unit is powered up.

10. The display device of claim 5, wherein the touch state flag is set to an activated state if a touch has been received by the sensing units.

11. The display device of claim 5, wherein the memory state flag is set to an activated state if the data classification unit has stored all the horizontal and vertical data in the memory.

12. The display device of claim 1, wherein the touch detection unit further comprises an interface to an external apparatus.

13. The display device of claim 12, wherein the interface is a serial peripheral interface (SPI).

14. The display device of claim 1, wherein each of the sensing units comprises a variable capacitor having a capacitance that varies with an external pressure, and a reference capacitor having a predetermined capacitance.

15. A method of controlling a touch detection unit in response to touches received by a plurality of sensing units of a display panel, the touch detection unit comprising a first controller and a second controller, the method comprising:
- determining whether or not an external enable signal is received by the touch detection unit;
- supplying power to initialize operation of the touch detection unit in response to the external enable signal;
- performing the following in the first controller:
  - classifying a plurality of sensing signals generated by the sensing units,
  - storing the classified sensing signals in a memory,
  - determining based on the sensing signals whether or not a touch has been received by the sensing units and whether or not the sensing signals are in a desired range, and
  - setting a wakeup flag to an activated state; and
- performing the following in the second controller if the wakeup flag is set to the activated state:
  - stabilizing the sensing signals in the desired range, and
  - determining a position of the touch based on the sensing data.

16. The method of claim 15, further comprising setting the wakeup flag and an unstable state flag each to the activated state, wherein the stabilizing is performed if the wakeup flag and unstable state flag are each set to the activated state.

17. The method of claim 16, wherein:
- the classifying comprises classifying the sensing signals into vertical and horizontal sensing signals;
- the storing comprises storing the classified vertical and horizontal sensing signals in the memory; and
- the method further comprises setting a memory state flag to the activated state after the storing, wherein the setting the memory state flag is performed by the first controller.

18. The method of claim 17, further comprising performing the following in the first controller:
- if the wakeup flag is in the activated state, allowing the second controller to operate; and
- if the wakeup flag is not in the activated state, determining whether or not the sensing signals are in the desired range.

19. The method of claim 18, further comprising performing the following in the first controller:
- if the sensing signals are in the desired range, determining whether or not a touch has been received by the sensing units; and
- if the sensing signals are not in the desired range, setting the wakeup flag and the touch state flag to activated states.

20. The method of claim 19, further comprising performing the following in the first controller: setting the wakeup flag and the touch state flag to activated states if a touch has been received by the sensing units.

21. The method of claim 20, further comprising performing the following in the second controller:
- determining whether or not the memory state flag is in the activated state;
- if the memory state flag is in the activated state, determining whether or not the unstable state flag is in the activated state; and
- if the unstable state flag is in the activated state: setting the memory state flag to an inactivated state, determining whether or not the sensing signals are in the desired range, and outputting a control signal for changing a level of the sensing signals if the sensing signals are in the desired range.

22. The method of claim 21, further comprising performing the following in the second controller:
- if the sensing signals are in the desired range:
  - setting the wakeup flag to an inactivated state; and
  - powering down the second controller.

23. The method of claim 22, further comprising performing the following in the second controller:
- if the unstable state flag is in an inactivated state, determining whether or not the touch state flag is in the activated state;
- if the touch state flag is in the inactivated state, setting the wakeup flag to the inactivated state and powering down the second controller; and
- if the touch state flag is in the activated state, determining a touch position on the sensing units and generating touch information.

24. The method of claim 23, further comprising performing the following in the second controller:
- if a touch has been received by the sensing units, determining whether or not the memory state flag is in the activated state; and
- if a touch has not been received by the sensing units, setting the wakeup flag to the inactivated state and powering down the second controller.

* * * * *